(12) United States Patent
Jaakkola et al.

(10) Patent No.: US 7,835,742 B2
(45) Date of Patent: Nov. 16, 2010

(54) HANDOVER

(75) Inventors: Mikko Jaakkola, Lempäälä (FI); Henry Haverinen, Puuppola (FI); Anne Huotari, Tampere (FI); Jukka-Juhana Latva, Tampere (FI)

(73) Assignee: Nokia Corporation, Espoo (FI)

( * ) Notice: Subject to any disclaimer, the term of this patent is extended or adjusted under 35 U.S.C. 154(b) by 1139 days.

(21) Appl. No.: 10/748,981

(22) Filed: Dec. 30, 2003

(65) Prior Publication Data

US 2004/0266436 A1 Dec. 30, 2004

(30) Foreign Application Priority Data

Jun. 27, 2003 (FI) ................................. 20030967

(51) Int. Cl.
*H04W 74/00* (2009.01)
*H04W 36/00* (2009.01)

(52) U.S. Cl. ..................... 455/436; 455/437; 455/422.1; 455/552.1; 370/331; 370/332; 370/329

(58) Field of Classification Search ................. 455/436, 455/437, 422.1, 552.1, 439, 442; 370/331, 370/332, 329
See application file for complete search history.

(56) References Cited

U.S. PATENT DOCUMENTS

| 6,269,395 | B1 | | 7/2001 | Blatherwick et al. | |
|---|---|---|---|---|---|
| 6,477,156 | B1 | * | 11/2002 | Ala-Laurila et al. | 370/331 |
| 6,496,493 | B1 | * | 12/2002 | Chung | 370/332 |
| 7,146,415 | B1 | | 12/2006 | Doi | |
| 7,509,417 | B1 | | 3/2009 | Kammer et al. | |
| 2001/0024953 | A1 | | 9/2001 | Balogh | |
| 2002/0022483 | A1 | | 2/2002 | Thompson et al. | |
| 2002/0136226 | A1 | | 9/2002 | Christoffel et al. | |
| 2003/0021254 | A1 | * | 1/2003 | Fukuda | 370/338 |
| 2003/0028819 | A1 | | 2/2003 | Chui et al. | |
| 2003/0088681 | A1 | | 5/2003 | Liscano et al. | |
| 2003/0100308 | A1 | | 5/2003 | Rusch | |
| 2003/0119481 | A1 | * | 6/2003 | Haverinen et al. | 455/411 |
| 2003/0125028 | A1 | * | 7/2003 | Reynolds | 455/437 |
| 2003/0186678 | A1 | * | 10/2003 | Lucidarme et al. | 455/406 |

(Continued)

FOREIGN PATENT DOCUMENTS

EP 0 781 064 A2 6/1997

(Continued)

OTHER PUBLICATIONS

Sep. 2003 3GPP TS 23.009, "Handover Procedures", v5.6.0.
U.S. Appl. No. 10/876,234, filed Jun. 24, 2004, Jaakkola et al.

*Primary Examiner*—Vincent P Harper
*Assistant Examiner*—Mahendra Patel
(74) *Attorney, Agent, or Firm*—Hollingsworth & Funk, LLC (57) ABSTRACT

The invention relates to a method for arranging handover in a wireless telecommunications system. Connection settings are stored in a terminal, wherein at least one network identifier is associated with alternative connection settings, the network identifier identifying a target network reachable by a connection from the terminal. The network identifier associated with the currently applied connection settings is compared with the network identifiers associated with the other available connection settings. The connection settings associated with the same network identifier as the one associated with the currently applied connection settings are then selected. The handover may then be carried out by using the selected connection settings.

19 Claims, 2 Drawing Sheets

U.S. PATENT DOCUMENTS

| | | |
|---|---|---|
| 2003/0193910 A1 * | 10/2003 | Shoaib et al. ............... 370/331 |
| 2004/0073626 A1 | 4/2004 | Major et al. |
| 2004/0133687 A1 | 7/2004 | Yamaguchi et al. |
| 2004/0204097 A1 * | 10/2004 | Scheinert et al. ........... 455/561 |
| 2004/0215794 A1 | 10/2004 | Lauer |
| 2005/0055371 A1 | 3/2005 | Sunder et al. |
| 2005/0101323 A1 * | 5/2005 | De Beer .................. 455/435.2 |

FOREIGN PATENT DOCUMENTS

| | | |
|---|---|---|
| EP | 1 398 912 A1 | 3/2004 |
| WO | WO 01/63843 * | 8/2001 |
| WO | WO 03/037023 A1 | 5/2003 |

* cited by examiner

HANDOVER

FIELD OF THE INVENTION

The present invention relates to arranging handover, more specifically to determining connection settings which are applied to the new connection.

BACKGROUND OF THE INVENTION

Today, many wireless terminals are capable of providing a wide variety of telecommunications services. For instance, a terminal may be capable of providing circuit-switched speech and data transfer services, packet-switched data transfer services and messaging services, such as SMS (Short Message Service). These services may be provided via one type of network or different types of networks. For instance, the packet-switched data transfer service of the terminal may be provided by a connection to a wireless local area network (WLAN) access point, and the circuit-switched services may be provided by a connection to a public land mobile network (PLMN).

To provide a continuous service for the user, a mobile terminal has to carry out a handover process to change from one channel or bearer service to another. This change of channel may also cause the change of base station or another network element, such as a network element controlling a base station or a core network element, for example a mobile switching centre or a support node of packet-switched services. It should be noted that handover may even occur to another kind of system (inter-system handover), for example between a GSM network and 3GPP (Third Generation Partnership Project) UMTS network (Universal Mobile Telecommunications System) and/or WLAN.

Thus, there may be many alternative access services and thereby also alternative settings (possibly alternative collections of settings) available. The terminal has to decide which of the available network connections should be established to replace the original connection. A handover algorithm conventionally decides on handover on the basis of the signal qualities and/or some other quality information of the available radio access channels, i.e. selects the radio access channel with best quality. Thus, the connection settings associated with the radio access node (e.g. WLAN access point) selected by the handover algorithm are then used to establish the new connection. However, it is possible that some of the available access networks or logical access nodes are not connected to other networks or, for some other reason, it is not possible to establish a connection from there to a desired target network entity. For instance, missing roaming agreements may cause this situation. Therefore, when this kind of network resource is selected, for example based on the signal strength in a handover algorithm in the terminal, the connection is lost after handover.

BRIEF DESCRIPTIONS OF THE INVENTION

An object of the invention is to provide an enhanced method for handover initiation. The object of the invention is achieved by a method, a terminal and a computer program product, which are characterized by what is disclosed in the independent claims. The preferred embodiments of the invention are set forth in the dependent claims.

According to the invention, connection settings are stored in a terminal, wherein (at least one) network identifier is associated with alternative connection settings, the network identifier identifying a target network reachable by a connection from the terminal. For handover arrangement purposes, the network identifier associated with the currently applied connection settings is compared with the network identifiers associated with other available connection settings. The (at least one of the available) connection settings associated with the same network identifier as the one associated with the currently applied the connection settings are then selected. Handover may then be carried out by using the selected connection settings.

The term "network identifier" refers generally to an identifier for a target network resource reachable by a connection from the terminal, for example to a logical access point to the Internet. The term "handover" refers generally to a process for changing one or more connection settings such that an original connection is changed to a new one; in a typical case, at least a radio access channel is changed. It is important to note that the terms "handover" and "connection" are to be understood in the broad sense such that handover may be applied in situations where there is no active application-level connection to be changed but instead a lower-layer original logical relationship or connection is changed from an originally applied or reserved channel (network) to a new one. For instance, a logical connection may exist for a packet-switched data transmission while the terminal is active. Such a change of network is also sometimes referred to as roaming. Handover may thus be arranged for a reserved connection capability (although not in active use) to another channel. This kind of state may be achieved by authentication or GPRS PDP context reservation, for instance. Thus, the change of connectivity (provided for example by a certain IP address or phone number) to a new channel can also be considered as handover although no active session exists.

One advantage of the invention is that the probability of the continuation of the user's session can be enhanced. The network identifier may be associated with such connection settings or groups of settings by which a connection can be and/or has been established to the network resource identified by the network identifier. As handovers to network elements or logical resources, from which a connection to the network resource cannot be arranged, can be avoided or at least reduced, service continuity, and thus also user experience, is improved.

In one embodiment of the invention, the network identifier is defined internally in the terminal and associated with at least one connection setting. This embodiment enables the network identifiers to be in any format, in other words, the user of the terminal may define the network identifiers according to the purpose of the properties of the network resource (or the connection thereto) identified by the network identifier. When the network identifiers are defined internally in the terminal, there is no need to receive them from the available network elements but another some other identifier (for example a base station identifier), which will be received anyway and is associated indirectly or directly with the network identifier, suffices to make a difference between the different connection alternatives. Thus, there is no need to change the current messages from the network elements to the terminal.

In yet another embodiment of the invention, the network identifiers of the available other connection setting are checked in response to a need to arrange handover for the original connection based on the currently applied connection settings. An advantage of this embodiment is that the available alternative connection settings are known at the moment of handover. In an alternative embodiment, the checking step is performed using another triggering criterion, such as periodically and/or after measurements of the available radio resources.

BRIEF DESCRIPTION OF THE DRAWINGS

In the following, the invention will be described in further detail by means of preferred embodiments and with reference to the accompanying drawings, in which.

DETAILED DESCRIPTION OF THE INVENTION

The invention can be used in any telecommunications apparatuses, to which a handover algorithm may be applied for selecting the applied connection settings to be used for communication. Thus, the applicability of the invention is not limited to the network technologies shown in FIG. 1, but may be applied in networks of other kind and in any kind of combination of networks, for instance in apparatuses supporting the 3GPP UMTS system.

Figure 1:
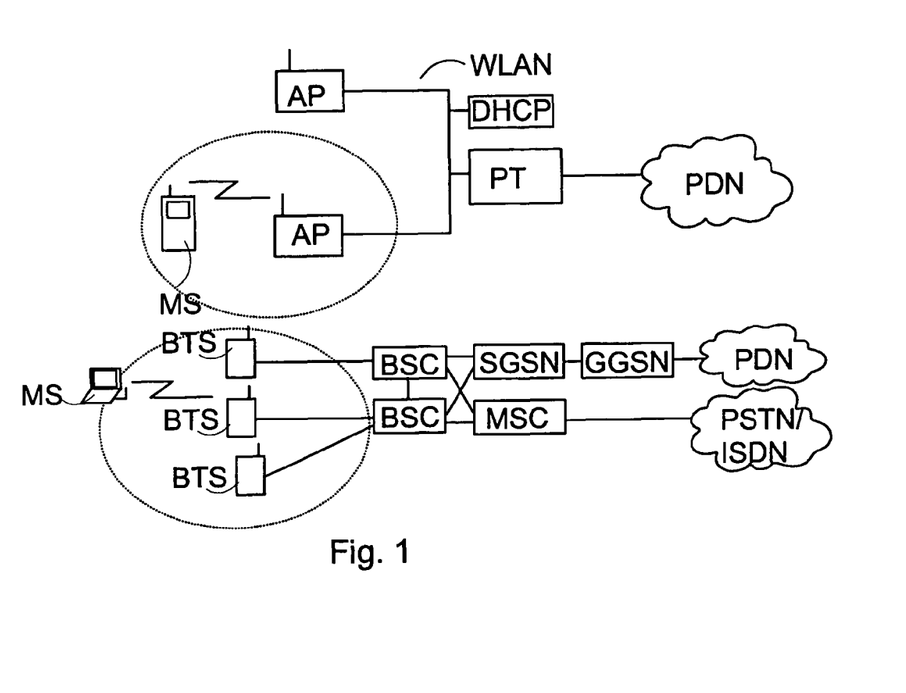
FIG. 1 is a block diagram showing a telecommunications system.

FIG. 1 shows one example of a telecommunications system comprising a wireless local area network WLAN and a PLMN network, namely a GSM/GPRS network. The wireless local area network WLAN comprises access devices called access points AP that offer radio access to a mobile station MS and thus terminate the broadband radio link. The access point AP manages the radio interface in accordance with the radio technology used: in accordance with the IEEE 802.11 standard in one embodiment. A wireless network connection can also be set up directly between two mobile stations MS comprising a WLAN transceiver (Ad-hoc). The IEEE 802.11 specifications specify the protocols of both the physical layer and the MAC layer for data transfer over the radio interface. The AP also attends to the bridging or routing of radio interface data streams to and from other network nodes. The WLAN network may also provide a gateway interface to packet data networks PDN, such as the Internet, via a device called a portal PT or a bridge. Typically, the WLAN network also comprises other servers, such as a DHCP server (Dynamic Host Configuration Protocol) that allocates IP addresses to mobile stations MS. Typically, in the area where there is WLAN coverage, there is also PLMN coverage. It should be noted that the WLAN network may also comprise logical access points providing logical access to a network resource, which are not to be mixed with the physical access points (in FIG. 1 AP) acting as base stations and providing only radio access.

In the PLMN of FIG. 1, a mobile services switching centre MSC provides the mobile station MS with circuit-switched services. A core network providing packet-switched services comprises a Serving GPRS Support Node (SGSN) that serves mobile stations MS connected to a base station subsystem, and a Gateway GPRS Support Node (GGSN) that provides a gateway function to external networks PDN, such as the Internet or a company's intranet. The system may also comprise other known network elements not shown in FIG. 1, such as a short message service centre and elements of a billing system. Both the SGSN and the MSCNLR utilize the same Base Station System (BSS). The BSS comprises Base Transceiver Stations (BTS) communicating with the mobile stations MS over a radio path and Base Station Controllers (BSC) for controlling the radio frequencies and radio channels available to the base transceiver stations BTS connected to them. A base transceiver station BTS always comprises at least one transceiver that implements one carrier, i.e. eight timeslots, i.e. eight physical channels. One base transceiver station BTS typically serves one cell, but a solution is feasible wherein one base transceiver station BTS serves several sectored cells. The cells overlap slightly such that the connection can be maintained when the mobile station MS is moving from the coverage area of a BTS to another.

Figure 2:
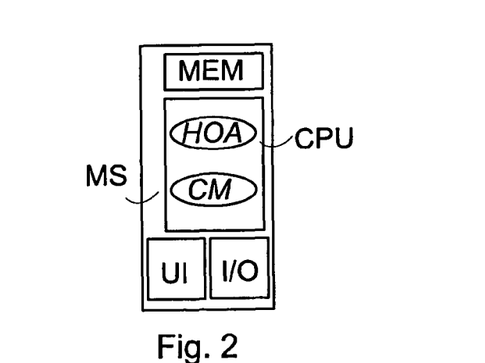
FIG. 2 is a block diagram illustrating a mobile station according to an embodiment of the invention.

As an example, the mobile station MS may be a conventional mobile terminal with speech and data transmission capabilities, a PDA device with telecommunication means, or a laptop computer provided by telecommunications means, for example by a removable data card. It should be noted that the mobile station MS may support communication with one or more access types; in the example of FIG. 1, the MS may communicate with WLAN and GSM/GPRS networks. As illustrated in FIG. 2, a mobile station MS comprises memory MEM, a user interface UI, I/O-means I/O for arranging communication, and a Central Processing Unit CPU comprising one or more processors. Computer program codes executed in the central processing unit CPU are used for causing the MS to implement at least one handover algorithm HOA, and control means CM at least for controlling the selection of connection resources for handover purposes, some embodiments of which are illustrated later in association with FIGS. 3 and 4. It is to be noted that a modified handover algorithm HOA may implement this functionality. The term handover algorithm refers generally to any kind of process selecting connection settings amongst the available connection settings for the MS and thus deciding whether the MS should change to use another (signalling and/or traffic) connection. The handover algorithm HOA may provide inter-system handovers (for example handover of GPRS PDP contexts to WLAN system and vice versa) and/or intra-system handovers (ordinary handovers within a cell, BTS, BSC, MSC/SGSN or between MSCs/SGSNs), or there may be more than one handover algorithms HOA in the mobile station MS. Hardware solutions or a combination of hardware and software solutions may also be used to implement the inventive functions.

Various connection settings are stored in the memory MEM of the mobile station MS. These connection settings depend on the underlying transmission technologies. For instance, for WLAN access these settings may comprise operation mode settings (ad-hoc or infrastructure), network identifiers, channel settings, TCP/IP (Transport Control Protocol/Internet Protocol) settings and domain logon and workgroup settings. TCP/IP settings comprise information about the used IP addresses, DHCP settings (whether DHCP is used or not), gateways, DNS (Domain Name System) servers and WINS (Windows Internet Naming Service). There are many ways to store information about alternative connection settings, which may also be referred to as alternative connection resources. Connection settings may be grouped as alternative groups of connection settings comprising more than one connection setting and defining one way to establish a connection from the mobile station. These groups of settings can also be referred to as connection sets or profiles, and they may determine access to different networks but also alternative connection methods within a network.

Network identifiers identifying a target network and reachable by the mobile station MS are associated with alternative connection settings. A network identifier may be associated with a single connection setting, and/or a network identifier may be associated with a group of connection settings. In one embodiment, the network identifiers are created internally in the mobile station MS. The network identifier identifies the target network to which a connection using the associated (group of) network settings can be made. In one embodiment, the network identifier identifies an Internet Service Provider (ISP). Thus, the network identifier needs not identify the corresponding node of the application layer connection (for example a WWW server in the Internet) but rather the device or a logical resource to which a connection is established from the access network (in one embodiment WLAN or GSM/GPRS network) serving the mobile station MS. However, as in one embodiment, the network identifier is entirely internal to the mobile station, the network identifier may be determined freely, for example simply as "home serves". In one embodiment the user may determine the network identifier. Table 1 illustrates some examples of settings associated with network identifiers and thus grouped as alternative groups of settings under network identifiers.

TABLE 1

| Network identifier | Access point Name | Network service |
|---|---|---|
| Office | Corp WLAN NW1 | WLAN |
| mail.corp.com (Office email) | Corp WLAN NW1 | WLAN |
| www.nokia.com | Hotspot1 | WLAN |
| 11.22.33.44 | Hotspot1 | WLAN |
| Home intranet | StevenNet NW2 | WLAN |
| mail.corp.com (Office email) | Corporate GPRS AP | GPRS |
| www.nokia.com | Corporate GPRS AP | GPRS |
| www.nokia.com | Public GPRS AP | GPRS |
| Internet | ISP AP | Dial-up |
| Office2 intranet | GPRS NW1 | GPRS |

In the example of Table 1, a corporate file server is associated with and can be connected by a corporate WLAN service (more particularly via a network named "Corp WLAN NW1"), but also via a specific GPRS APN, namely "Corporate GPRS AP". Other settings, instead of or in addition to the access point name and related to the specified connection to a network identifier, may also be associated with the network identifier The column for the network service is only for illustrative purposes and not necessary. It is to be noted that other and more technology-specific settings for example for accessing the Corporate GPRS AP may be stored in connection with the abovementioned information associating network identifiers with various (access) connection resources, or the mobile station may be configured to retrieve the more specific settings for the selected connection resource from another information set after a handover decision is made.

In the Symbian operating system, the Internet Access Points (IAP) comprise a parameter called Network ID, which is an internal identifier for the target network. It is currently used in routing decisions, and applications may use it when setting up network connections. According to an embodiment, the mobile station MS is configured to use this Network ID for handover decision purposes by utilizing at least part of the features illustrated below. This embodiment enables that, amongst the available connection resources (groupings of connection settings as separate IAPs), only the IAPs that provide connectivity to the same target network are considered when selecting the new connection due to the need for handover. The user may determine different (target) networks by associating a Network ID with a collection of settings defining access to this network resource, e.g. an Internet edge node, such as the GGSN or a specific sub-network connected to the Internet. A target network represents a first hop network to which a (logical) connection can be arranged from the mobile station MS. The IAPs comprise the connection settings which are required to access the respective target network. The user can be shown the name, Network ID, he/she has determined as the one best illustrating the connection resource which is accessible by this collection of settings. As already mentioned, according to an embodiment the handover logic HOA/CM may separate the different networks by the Network IDs. For example, a GPRS IAP may be determined as one connection resource (IAP in the Symbian terminology) for providing access to the Internet, i.e. the Internet is the target network. The GPRS IAP comprises not only the network identifier, but also the PDP context type (IPv4/IPv6), GPRS access point name, user identifier, password, and applied TCP/IP settings.

Figure 3:
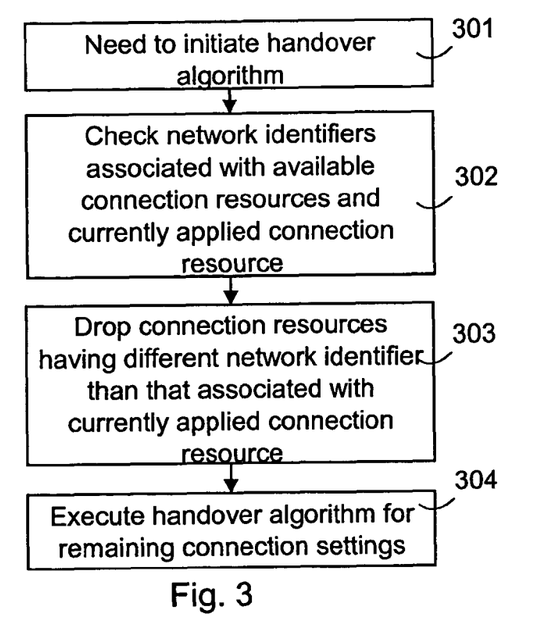
FIG. 3 is a flow chart illustrating a method according to an embodiment of the invention.

FIG. 3 illustrates a method according to an embodiment. This method may be implemented by the control means CM, for instance. Another possibility is to implement the method as part of the handover algorithm HOA. In step 301, there is a need to initiate the handover algorithm HOA. This step may be entered for any handover algorithm initiation reason, e.g. automatically based on radio channel measurements, at certain time intervals, as current connection is lost, as new network resource is detected, or based on user initiation.

In step 302, the network identifiers associated with the available (other) connection resources and the network identifier associated with the currently applied connection resource are checked. In one embodiment, the connection settings associated with the available logical access points are checked to determine the network identifiers. Typically, there is a number of connection settings associated with an access point, i.e. network identifiers in the groups of settings of available access points are then checked. The available connection resources can be determined based on received network information. For instance, collecting data about WLAN access points AP can be implemented by carrying out scanning of the available networks. Scanning the access points AP is as such a basic functionality defined in the IEEE 802.11 standard, in which the mobile station MS checks the radio channels one by one by sending probe requests and by searching for probe responses. The MS sends probe request messages to local access points AP and waits for probe response messages. In general, a probe response message comprises a network name, to which each access point belongs. This network name another received identifier is associated directly or indirectly with at least one network identifier in the connection settings stored in the mobile station MS. The same network identifier is typically associated with many different access settings (or access setting groups), i.e. there are many access resources which can be used to provide a connection to the target network identified by the network identifier. It is also feasible that there are many network identifiers associated with the access setting, such as the WLAN network name, which means that via the access network, there is an access possibility for many different target networks, such as Internet access nodes. These different network identifier and access setting(s) combinations can be considered as alternative connection resources. In addition to radio access-related settings, there may be alternative Access Point Names for GPRS, alternative dial-up servers, or alternative wireless LAN network names available, for instance.

In step 303, the connection resources that have a different network identifier than the one associated with the currently applied connection resource are dropped. Thus, the network identifiers of the available connection resources (in one embodiment on a list of candidate connection resources) are compared with the network identifier of the currently used connection, and only the connection resources that have the same network identifier as associated with the currently used connection remain as candidates.

In step 304, the handover algorithm is executed such that the remaining connection resources are taken into account as handover candidates, i.e. handover may be carried out for a channel and/or another networking resource associated with the same network identifier as associated with the current connection. When the handover algorithm HOA has been executed, the result may be that one or more connection settings need to be changed, i.e. handover needs to be carried out for the original connection. The respective connection settings are then changed and a new connection is then established by the changed connection settings. Signalling and/or user data may then be arranged to be sent and received using the new connection with the network resource identified by the network identifier. This embodiment enables that only such connection resources that provide a connection to the desired network resource associated with the network identifier are considered as handover candidates. Thus, the connection settings for the new connection are selected such that the network identifier for the new connection is the same as for the original connection.

The invention may be used with various kinds of handover algorithms HOA. Typical procedures of a handover algorithm HOA may then be carried out in step 304, i.e. the comparison of available channels and the selection of one of the available channels to be used on the basis of the channel quality properties or some other criteria. It is to be noted that the handover algorithm HOA may consider intra-system channels and/or inter-system channels, depending on the device capabilities and available systems. For instance, in the case of an inter-system handover algorithm HOA, the decision to change the channel by the algorithm HOA may be due to an available new network capable of serving the user better; e.g. providing a faster or less-costly transmission service. The handover algorithm HOA is typically proprietary and it is not necessary to change handover algorithms because of the present invention. If the output of the handover algorithm HOA is to change the channel, at least some of the access settings need to be changed in the mobile station MS. This decision may cause at least one of the following: the change of the access network or access device providing the connection for the terminal, change of the access method type, change of the properties of the current access method. The change of the connection may be arranged according to the underlying networks and transfer protocols. For instance, the 3GPP specification TS 23.009 "Handover Procedures", v.5.6.0, September 2003, describes inter access network and intra access network handover procedures for the 3GPP system, for instance between the GSM/GPRS network and 3GPP network.

According to a further embodiment, the radio measurements prior to an actual channel selection by the handover algorithm HOA are avoided for connection resources with a different network identifier than the current connection. Thus, the radio measurements are done after step 303 only for the radio channels of the remaining connection resources. This embodiment further saves the resources of the mobile station MS.

Figure 4:
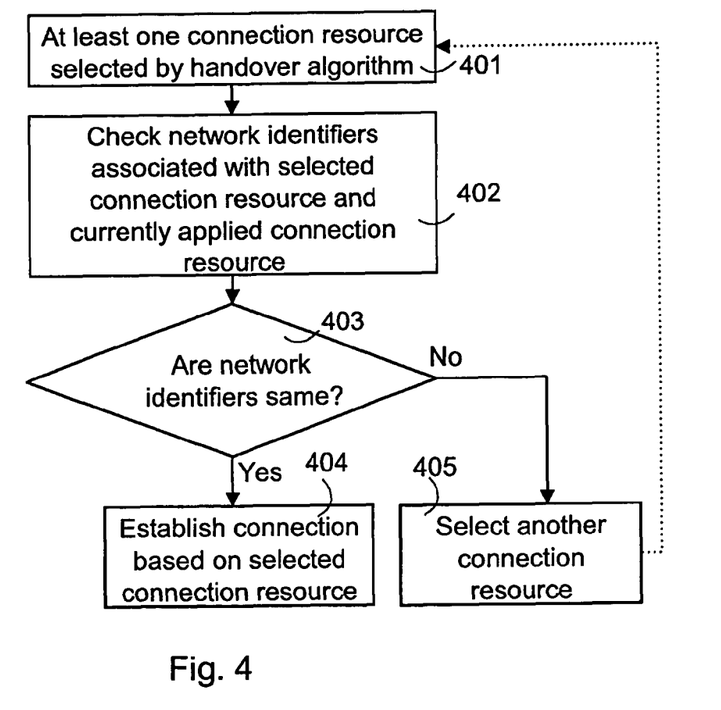
FIG. 4 is a flow chart illustrating a method according to another embodiment of the invention.

Another embodiment is described in the following with reference to FIG. 4. In the method of FIG. 4, a handover algorithm HOA has already been executed or is being executed. Step 401 is entered when at least one available (logical) connection resource is selected by the handover algorithm HOA. Thus, because of a handover algorithm triggering criterion, such as one of those mentioned in step 301, the handover algorithm HOA has been initiated and it has selected one connection resource on the basis of a predetermined selection criterion. In one embodiment, the handover algorithm HOA has selected one of the available access points, e.g. a WLAN access point AP to replace the current access point.

In step 402, the network identifier associated with the selected connection resource is checked. In step 403, this network identifier is compared with the network identifier associated with the currently applied connection resource, i.e. at least one connection setting used for the current connection to the network resource identified by the network identifier. More particularly, in step 403, it is checked whether the network identifier is the same as the one associated with the currently applied connection resource. For instance, the network identifier associated with the currently used WLAN access point AP is compared with a network identifier associated with another WLAN access point AP selected by the handover algorithm and providing a radio access service with higher quality for the mobile station MS than the currently used access point AP.

If, based on the check in step 403, the network identifiers are the same, a connection may be established 404 according to the selected connection resource. In one embodiment, at least one applied radio access channel is then changed; as already mentioned, the handover may be intra-system or inter-system handover. Thus, the functions according to the applied access method are performed and at least one radio access setting is changed such that a channel is reserved and taken into use. It is also feasible that at least one non-radio access related setting is changed based of the decision of the handover algorithm HOA in step 404 (or after step 304), and a new logical connection is established. For instance, the applied IAP is changed to another one using the same radio access service as the previous one.

If the network identifiers are different, another connection resource is selected 405. In this step, the handover algorithm HOA may again be entered by excluding the previous connection resource candidate, or if the handover algorithm HOA has at least one secondary connection resource, it is selected. The handover algorithm HOA may have ordered the available connection resources in an order of preference, whereby the next one accordingly is selected. After a new connection resource is selected, step 401 may be again entered.

According to an embodiment, another criterion than the network identifier may also be utilized for selecting the connection resources as handover candidates and/or excluding them in the embodiments illustrated above. This exclusion or addition of connection resources may be applied before or after step 303 in the embodiment of FIG. 3 and/or step 401 or 404 in embodiment of FIG. 4. In one further embodiment, the user may exclude or add further connection resources, e.g. determine a priorization order or criterion to be applied for the connection resources in addition to the network identifier-based selection criterion described above. For instance, the user may determine that a certain WLAN access point AP is to be preferred over the other available access points AP. Thus, the mobile station MS is configured to select access points AP (associated with the same network identifier as the currently serving access point) in an order of priority. In another embodiment, services provided with different candidate connection resources are compared and connection resources providing the same or the most similar service as the currently applied connection resource are preferred.

In one embodiment, an authorization from the user via the user interface UI is inquired before handover is to be carried out using the selected connection resources (after step 304 or before step 404). Thus, the handover is performed only if an authorization is received from the user.

In one embodiment, if based on the check 302, 303 or the one illustrated in FIG. 4, there are no available connection resources with the same network identifier as associated with the currently applied connection resource, the mobile station MS is configured to select a connection resource with a different network identifier or to execute a handover algorithm for the connection resources with different network identifiers. According to another embodiment, this functionality is applied if there is at least one connection resource with a different network identifier than associated with the currently applied connection resource and having another property which is better than the corresponding property of the connection resources with the same network identifier as associated with the current connection. There may be a threshold criterion that must be attained in order to perform or consider handover using a connection resource with a different network identifier. For instance, a WLAN access point with a significantly better radio signal quality but with a different network identifier may be selected. The mobile station MS may be configured to provide a possibility for the user to specify alternative or secondary network identifiers to be used, if handover is not possible using the connection resources associated with the original, primary, network identifier. For instance, if handover needs to be performed and can only be performed to a network from which there is no access to the ISP AP identified by the network identifier, a secondary ISP AP and the connection resources associated thereto may then selected.

In a further embodiment, the user may be asked for authorization to perform handover by using connection resources associated with another network identifier than what is associated with the current connection resource. Only if an authorization is received from the user, such handover can be performed or considered.

According to one embodiment, the associations between the network identifiers and the connection settings are maintained in the mobile station MS based on earlier usage history. The MS may maintain history data, wherein at least one connection setting, which has been used for establishing a connection to the network resource identified by the network identifier (which may or may not be determined by the user), is associated with the network identifier. In one embodiment, the MS maintains associations between a network identifier and such connection settings by which a connection to the network identifier has succeeded, i.e. adds an entry (association) after a connection has succeeded. The history data may then be checked in step 302 or 402. The selection of connection settings to be used may thus be arranged using only such (connection setting/connection setting group) candidates which have already provided a successful connection to the network resource identified by the network identifier of the current connection, and handovers using such connection settings by which a connection has not earlier succeeded can be avoided. In an alternative embodiment, information on unsuccessful connections is maintained and these associations are avoided.

The accompanying drawings and the description pertaining to them are only intended to illustrate the present invention. Different variations and modifications to the invention will be apparent to those skilled in the art without departing from the scope of the invention defined in the appended claims. Features may thus be omitted, combined, modified or replaced by equivalents.

The invention claimed is:

1. A method comprising:

storing in a terminal connection settings and network identifiers, wherein at least one network identifier of the stored network identifiers is associated with at least some alternative connection settings, the network identifier identifying a target network reachable by a connection from the terminal and wherein the connection settings are grouped as alternative groups of connection settings such that at least one network identifier is associated with each group, comparing, in the terminal, a current network identifier identifying a target network of a current connection of the terminal and associated with the currently applied at least one connection setting to the stored network identifiers of different groups associated with other available connection settings, selecting a group of connection settings associated with a network identifier that is the same as the network identifier associated with the currently applied at least one connection setting for a new connection, and carrying out a handover related function to continue providing access to the target network via a new access point by using the selected group of connection settings.

2. The method according to claim 1, wherein the network identifiers of the other available connection settings are checked in response to a need to arrange handover for the original connection based on the currently applied at least one connection setting.

3. The method according to claim 2, wherein at least one available connection setting associated with a different network identifier than the one associated with the at least one currently applied connection setting is dropped, and a handover algorithm is executed for the remaining connection settings.

4. The method according to claim 1, wherein at least one available connection setting associated with a different network identifier than the one associated with the at least one currently applied connection setting is dropped, and a handover algorithm is executed for the remaining connection settings.

5. The method according to claim 1, wherein the network identifier associated with at least one connection setting is selected by a handover algorithm and is checked, and handover is carried out using the selected at least one connection setting if the network identifier is the same as the network identifier associated with the currently applied at least one connection setting, or at least one new connection setting is selected.

6. The method according to claim 1, wherein at least one network identifier is defined internally in the terminal and associated with at least one connection setting.

7. The method according to claim 1, wherein the at least one available connection setting is determined based on information received from the network.

8. A wireless terminal comprising:

a memory including computer program code for storing connection settings and network identifiers, wherein at least one network identifier of the stored network identifiers is associated with at least some alternative connection settings, the network identifier identifying a target network reachable by a connection from the terminal and wherein the connection settings are grouped as alternative groups of connection settings, and at least one network identifier is associated with each group, and at least one processor, the memory and the computer program code configured to, with the at least one processor, cause the terminal at least to compare a current network identifier identifying a target network of a current connection of the terminal and associated with the currently applied at least one connection setting to the stored network identifiers of different groups associated with other available connection settings, select a group of connection settings associated with a network identifier that is the same as the network identifier associated with the currently applied at least one connection setting for a new connection, and carry out a handover related function to continue providing access to the target network via a new access point by using the selected group of connection settings.

9. The terminal according to claim 8, wherein the processor checks the network identifiers of the other available connection settings in response to a need to arrange handover for the original connection based on the currently applied at least one connection setting.

10. The terminal according to claim 9, wherein the processor drops at least one available connection setting associated with a different network identifier than the one associated with the at least one currently applied connection setting, and
executes a handover algorithm for the remaining connection settings.

11. The terminal according to claim 8, wherein the processor drops at least one available connection setting associated with a different network identifier than the one associated with the at least one currently applied connection setting, and
executes a handover algorithm for the remaining connection settings.

12. The terminal according to claim 8, wherein the terminal is configured to check the network identifier associated with at least one connection setting selected by a handover algorithm, and
the terminal is configured to carry out the handover using the selected at least one connection setting if the network identifier is the same as the network identifier associated with the currently applied at least one connection setting, or
the terminal is configured to select at least one new connection setting.

13. The terminal according to claim 8, wherein the terminal is configured to define at least one network identifier internally and the terminal is configured to associate the network identifier with at least one connection setting.

14. The terminal according to claim 8, wherein the terminal is configured to determine the available at least one connection setting based on information received from the network.

15. A computer-readable medium, wherein said computer-readable medium comprises computer-executable instructions stored thereon for controlling a wireless terminal at least to:

store connection settings and network identifiers, wherein at least one network identifier of the stored network identifiers is associated with at least some alternative connection settings, the network identifier identifying a target network reachable by a connection from the terminal and wherein the connection settings are grouped as alternative groups of connection settings such that at least one network identifier is associated with each group, compare a current network identifier identifying a target network of a current connection of the terminal and associated with the currently applied at least one connection setting to the stored network identifiers of different groups associated with available other connection settings, select a group of connection settings associated with a network identifier that is the same as the network identifier associated with the currently applied at least one connection setting for a new connection, and carry out a handover related function to continue providing access to the target network via a new access point by using the selected group of connection settings.

16. The computer-readable medium according to claim 15, further comprising computer-executable instructions for checking the network identifiers of the other available connection settings in response to a need to arrange handover for the original connection based on the currently applied at least one connection setting.

17. A terminal comprising:
means for establishing access with a wireless network,
means for storing connection settings and network identifiers, wherein at least one network identifier of the stored network identifiers is associated with at least some alternative connection settings, the network identifier identifying a target network reachable by a connection from the terminal and wherein the connection settings are grouped as alternative groups of connection settings such that at least one network identifier is associated with each group,
means for comparing a current network identifier identifying a target network of a current connection of the terminal and associated with the currently applied at least one connection setting to the stored network identifiers of different groups associated with other available connection settings to select a group of connection settings associated with a network identifier that is the same network identifier as the network identifier associated with the currently applied at least one connection setting for a new connection, and
means for carrying out a handover related function to continue providing access to the target network via a new access point by using the selected group of connection settings.

18. The terminal according to claim 17, comprising means for checking the network identifiers of the other available connection settings in response to a need to arrange handover for the original connection based on the currently applied at least one connection setting.

19. The terminal according to claim 8, wherein the terminal is a multimode mobile station.

\* \* \* \* \*

UNITED STATES PATENT AND TRADEMARK OFFICE
CERTIFICATE OF CORRECTION

PATENT NO. : 7,835,742 B2  Page 1 of 1
APPLICATION NO. : 10/748981
DATED : November 16, 2010
INVENTOR(S) : Mikko Jaakkola et al.

It is certified that error appears in the above-identified patent and that said Letters Patent is hereby corrected as shown below:

In the Claims

Column 12, Claim 17, line 44: "network identifier as the network" should be --as the network--.

Signed and Sealed this
Twenty-second Day of February, 2011

David J. Kappos
*Director of the United States Patent and Trademark Office*